(12) United States Patent
Latha R et al.

(10) Patent No.: US 10,257,257 B2
(45) Date of Patent: Apr. 9, 2019

(54) DIRECT ACCESS TO NETWORK FILE SYSTEM EXPORTED SHARE

(71) Applicant: Hewlett Packard Enterprise Development LP, Houston, TX (US)

(72) Inventors: Usha Latha R, Bangalore (IN); Ratnala Satya Kishore, Bangalore (IN); Neducheralathan Shanmugam, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 169 days.

(21) Appl. No.: 15/115,841

(22) PCT Filed: Apr. 2, 2014

(86) PCT No.: PCT/IN2014/000209
§ 371 (c)(1),
(2) Date: Aug. 1, 2016

(87) PCT Pub. No.: WO2015/151113
PCT Pub. Date: Oct. 8, 2015

(65) Prior Publication Data
US 2017/0019457 A1    Jan. 19, 2017

(51) Int. Cl.
*G06F 15/16* (2006.01)
*H04L 29/08* (2006.01)
(Continued)

(52) U.S. Cl.
CPC ........ *H04L 67/06* (2013.01); *G06F 17/30203* (2013.01); *H04L 67/1097* (2013.01); *H04L 67/2842* (2013.01); *H04L 67/42* (2013.01)

(58) Field of Classification Search
USPC ....... 709/212, 213, 216, 203, 206, 217, 219, 709/223, 224, 226, 228, 230, 232, 238;
(Continued)

(56) References Cited

U.S. PATENT DOCUMENTS 5,682,534 A    10/1997  Kapoor et al.
6,728,788 B1    4/2004  Ainsworth et al.
(Continued)

FOREIGN PATENT DOCUMENTS

EP    1441470    7/2004

OTHER PUBLICATIONS

Butt, A.R. et al.; Kosha: a Peer-to-peer Enhancement for the Network File System; http://people.cs.vt.edu/butta/docs/sc04.pdf>; Nov. 6-12, 2004, 11 Pgs.
(Continued)

*Primary Examiner* — Quang N Nguyen
(74) *Attorney, Agent, or Firm* — Hewlett Packard Enterprise Patent Department

(57) ABSTRACT

Techniques for direct access of a Network File System (NFS) exported share are provided. In one aspect, a request to access a NFS exported share may be received at a NFS client. It may be determined that a NFS server exporting the share is running on the same node that is running the NFS client. The exported share may be directly accessed by the NFS client.

16 Claims, 6 Drawing Sheets

(51) Int. Cl.
  *G06F 17/30* (2006.01)
  *H04L 29/06* (2006.01)
(58) Field of Classification Search
  USPC .............................................................. 726/7
  See application file for complete search history.

(56) References Cited

U.S. PATENT DOCUMENTS

| | | | |
|---|---|---|---|
| 7,124,171 B1* | 10/2006 | McCann | G06F 17/30103 |
| | | | 709/216 |
| 7,408,883 B2 | 8/2008 | Deragon et al. | |
| 2002/0065916 A1 | 5/2002 | Ooe et al. | |
| 2003/0115218 A1* | 6/2003 | Bobbitt | G06F 17/30233 |
| 2003/0212752 A1* | 11/2003 | Thunquest | G06F 17/30067 |
| | | | 709/213 |
| 2007/0153812 A1 | 7/2007 | Kemp | |
| 2012/0039332 A1 | 2/2012 | Jackowski et al. | |
| 2013/0133051 A1* | 5/2013 | Riemers | G06F 17/30091 |
| | | | 726/7 |
| 2015/0201016 A1* | 7/2015 | Golander | H04L 67/1097 |
| | | | 709/212 |

OTHER PUBLICATIONS

International Searching Authority, The International Search Report and the Written Opinion, dated Dec. 30, 2014, 11 Pages.

\* cited by examiner

__ US 10,257,257 B2 __

DIRECT ACCESS TO NETWORK FILE SYSTEM EXPORTED SHARE

BACKGROUND

The Network Ale System (NFS) protocol allows a client computer to access files that are stored on storage devices associated with a server computer, over a network. A NFS server exports a "share" which may be thought of as a directory within the file system associated with the server. A NFS client computer may then "mount" this exported share. Applications running on the client computer may access the mounted share as if it were a directory on the local file system of the client computer. The NFS client communicates over the network to the NFS server to physically access the storage volume containing the exported share.

DETAILED DESCRIPTION

Figure 1:
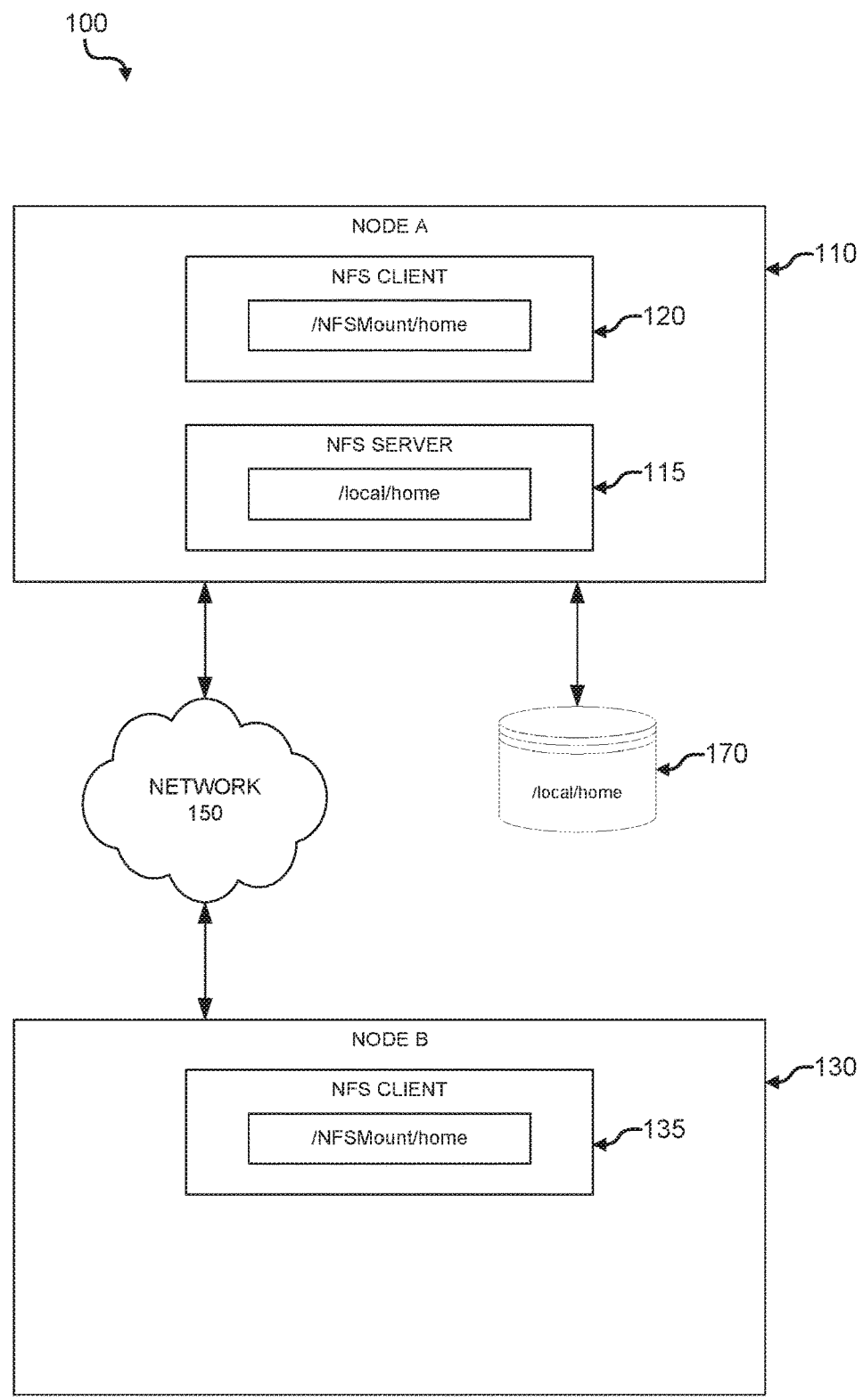
FIG. 1 is an example of a system that may utilize the NFS server bypass techniques described herein.

The Network File System (NFS) is a distributed computing file system that allows a system to share directories and files with other systems over a network. An NFS server may export a directory of a file system that is contained on storage that is directly associated with the server. The exported directory may be referred to as a share, or a network share. A NFS client may then mount the exported share. The applications running on the NFS client may then access the share just as if the directory was contained on a storage device that was directly associated with the NFS client. The fact the directory is actually located on a storage device associated with the NFS server is hidden by the NFS protocol.

In operation, an application running on a NFS client node may attempt to access a file contained in an exported share. The request may be received by the NFS client running on the node. The NFS client may allocate file cache space to process the file request. The NFS client may then make a remote procedure call (RPC) to the NFS server running on a node that is directly attached to the storage device containing the directory. The RPC may then be passed to a networking layer on the node running the NFS client. The networking layer may send the RPC to the node running the NFS server over a suitable network.

The networking layer at the NFS server may then receive the RPC form the network. The RPC may be passed to the NFS server to access the file system containing the exported share. As part of the process, file cache space may be allocated to store the file operation until the operation can be committed to the physical storage device. The NFS server may then perform the operation requested in the RPC directly on the file system. Once the operation is complete, the NFS server may release the allocated space from the file cache on the NFS server. The NFS server may respond to the NFS client through a response to the RPC, which is transmitted over the network layer. Upon receipt of the response, the NFS client may release the file cache space allocated for the operation. Finally, the NFS client may notify the application that the desired operation on the file from the exported share has completed.

Under certain circumstances, it is possible that the node running the NFS client and the NFS server are the same node. For example, this may occur when a NFS server is migrated from one node to another node. In such a case, the same process as described above may still occur, however instead of the RPC being transmitted over a network, a loopback interface of the node may be used. In essence, this means that the NFS server and NFS client are not aware that both processes are running on the same node. Thus, all the steps described above still take place.

Several problems may arise when a NFS client is attempting to access a share being exported by a NFS server and both the client and server are running on the same node. As mentioned above, the NFS client may allocate space in the file cache when beginning an operation. The NFS server also allocates space in the file cache. Both the client and the server may not release the space in the file cache until the operation has completed successfully. A problem occurs in that the file cache may be a single, node wide resource. The NFS client may request file operations that consume a large amount of the file cache. When the RPC is received by the NFS server, there may be insufficient file cache space available to allocate, because the NFS client has already consumed the space. A deadlock may result because the NFS client may not release space until the operation completes, but the operation may not complete until the NFS server is able to acquire file cache space.

Another problem that may arise is that the process of using the loopback interface may be computationally inefficient. As mentioned above, neither the NFS client nor NFS server may be aware that they are running on the same node. As such, the NFS client may run and send the RPC as discussed above. When the RPC is received over the loopback interface, a context switch is needed to allow the NFS server to begin execution. After the operation is complete, the process occurs in reverse, and a context switch is again necessary to allow the NFS client to run.

The techniques described herein overcome these problems by determining when the NFS client and the NFS server are running on the same node. If so, the RPC and networking layers may be bypassed. The NFS client may instead directly access the file system containing the exported share. Thus, there is no longer an issue with insufficient file cache space being available, as the potential for deadlock between the NFS server and NFS client may be eliminated. Furthermore, because the NFS client is directly accessing the file system, there is no longer a need for context switches between the NFS client and NFS server. These techniques are described in further detail below and in conjunction with the appended figures.

FIG. 1 is an example of a system that may utilize the NFS server bypass techniques described herein. System 100 may include a first node 110, referred to as node A, a second node 130, referred to as node B, and a network 150 coupling the first and second nodes. The network 150 may be any suitable communications network that allows node A and B to communicate. In one example implementation, the network may be an Ethernet network. The network may also be other types of networks, such as an intranet or the Internet. It should be understood that the techniques described herein are not dependent on the type of network used to couple the nodes, so long as the network is of a type that is suitable for establishing a communications channel between the nodes for transferring communications related to the NFS protocol.

Node A 110 may be coupled to a storage device 170. The storage device may be a device such as a disk drive that is directly attached to node A. The device may be a single disk drive, an array of disk drives, a persistent memory such as non-volatile random access memory, or any other suitable form of persistent memory. The storage device may be directly coupled to node A, or there may be an intervening network, such as a Storage Area Network (SAN) (not shown) disposed between node A and the storage device. What should be understood is that storage device 170 represents any suitable form of persistent storage that is coupled to node A, such that node A is able to directly read and write to the storage device.

Node A may also implement a NFS server 115. As explained above, a NFS server may allow a node to export a directory associated with a file system, such that the directory can be accessed by other nodes. This process is described in further detail below. Node A may also implement a NFS client 120. The NFS client may allow a node to access files contained in a directory exported by a NFS server. Node B may be a node similar to node A. Node B may implement a NFS client 135.

In operation, the storage device 170 may contain a directory, shown as the /local/home directory. The NFS server 115 may be configured to export the directory, also known as a share or network share, to NFS clients. Each of the NFS clients may then access the exported share as if the directory was located on the local machine. For example, the NFS client 135 on node B 130 may mount the exported /local/home network share to file system mount point shown as /NFSMount/home. Applications running on node B are able to access the directory /NFSMount/home as if the directory was contained on a storage device that was directly associated with node B. Any requests to access the /NFSMount/home directory are received by the NFS client and sent to the NFS server over the network 150. The NFS client and NFS server allow the /NFSMount/home directory to appear to node B to be a local directory, even thought the physical storage device 170 is associated with node A.

As mentioned above, in some configurations, the NFS client and the NFS server may be located on the same node. As shown, NFS client 120 has also mounted the /local/home directory at the file system mount point /NFSMount/home on node A 110. Absent the techniques described herein, access to the NFSmount/home directory by node A would be the same as that described with respect to node B, with the exception that instead of traversing the network 150, communications between the NFS client and Server would be over an internal (not shown) loopback interface.

The techniques described herein avoid the use of the loopback interface, and the problems described above, by bypassing the NFS server. When the NFS client receives a request to access an exported share, such as the /NFSmount/home directory, the NFS client first determines if the NFS server exporting the share is running on the same node. For example, this may be done by examining the Internet Protocol (IP) address of the node running the NFS client and the IP address of the node running the NFS server. If they are the same it indicates that the NFS client and NFS server are running on the same node.

If the NFS client and NFS server are running on the same node, the NFS client may bypass the NFS server. Instead, the NFS client may access the storage device directly. For example, because the NFS client 120 is running on a node that is associated with the storage device 170, the NFS client may directly access storage device 170. Thus, there is no need to allocate file cache space, which may lead to the deadlock problems described above. In addition, because the storage device may be accessed directly by the NFS client, there is no need to perform a context switch to and from the NFS server.

Figure 2:
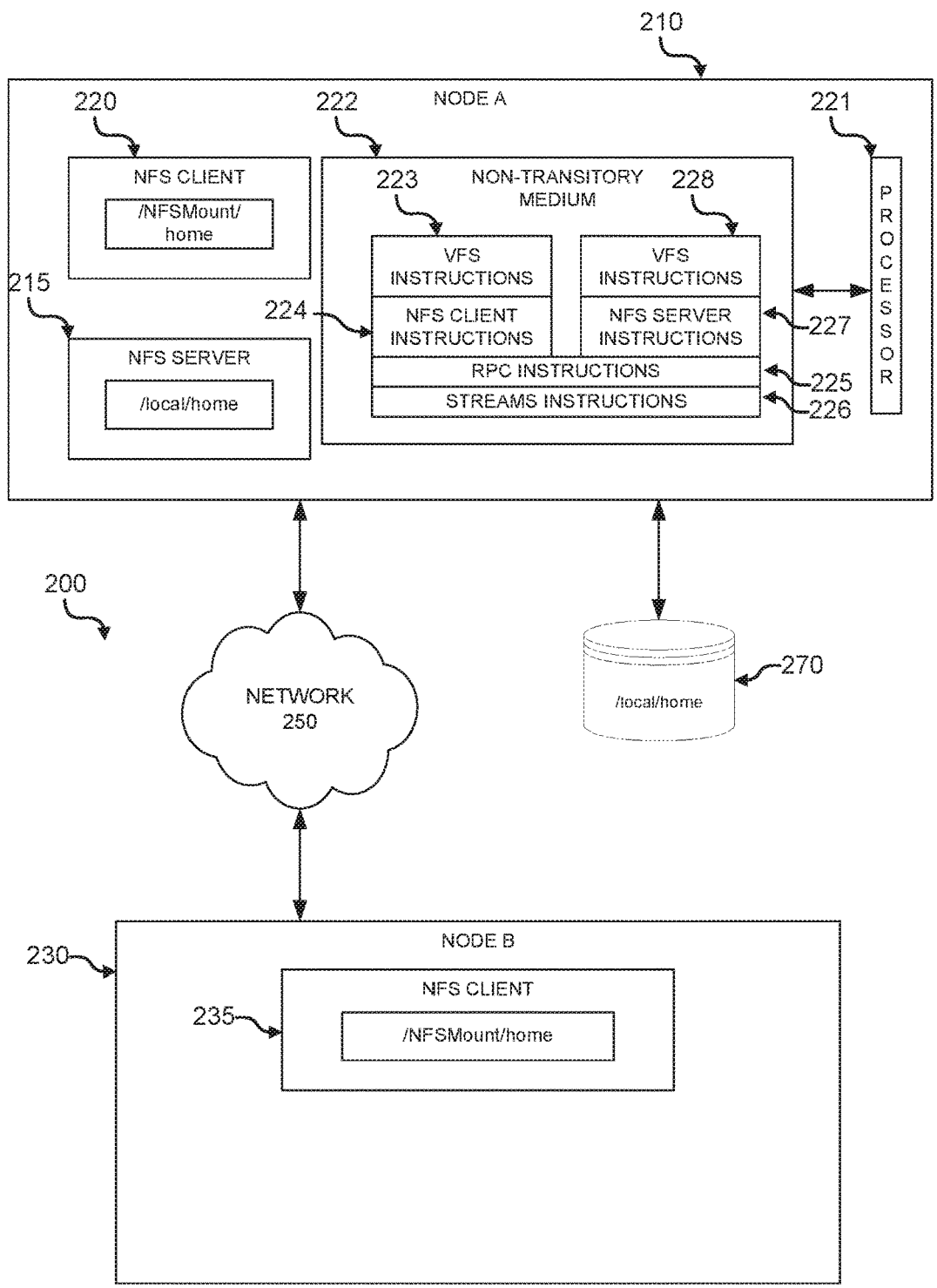
FIG. 2 is another example of a system that may utilize the NFS server bypass techniques described herein.

FIG. 2 is another example of a system that may utilize the NFS server bypass techniques described herein. FIG. 2 may include node A 210, node B 230, network 250 coupling the nodes, and storage device 270. These elements are similar to those described above with respect to FIG. 1. For ease of description, the details of these elements are not repeated here. Likewise, node A may include NFS server 215 and NFS client 220. Likewise, node B may include NFS client 235. Again, for ease of description the details are not repeated.

Node A may include a processor 221. The processor may be of any suitable type that is capable of reading and executing instructions to implement the techniques described herein. The processor may be coupled to a non-transitory processor readable medium 222. The medium 222 may include a set of instructions thereon, which when executed by the processor cause the processor to implement the functionality described herein. For example, the medium may include virtual file system instructions 223, NFS client instructions 224, RPC instructions 225, streams instructions 226, NFS server instructions 227, and virtual file system (VFS) instructions 228. Node B may include a similar structure (not shown), with the exception of the NFS server instructions, as node B is not depicted as including an NFS server.

The VFS is a construct maintained by an operating system of the node. The virtual file system is an interface between applications running on the node and the underlying physical file system. For example, the storage device 270 may utilize a physical file system, such as the Veritas™ File System (VxFS). Node A may implement a VFS that abstracts the details of the physical file system from applications running on the node. Thus, an application running on a node need only be aware of the VFS. The VFS instructions may be responsible for translating file operations performed by the application on the VFS into the proper commands used by the underlying physical file system.

NFS client instructions 224 may implement the NFS client protocol. For example, the NFS client instructions may allow the node to mount a directory that is being exported by a NFS server. When an application access the VFS to access a directory that is being provided by a NFS server, the NFS client instructions may translate those instructions into the corresponding NFS protocol instructions. The NFS client instructions may cause the processor to pass the commands to the RPC instructions 225. The RPC instructions may cause the processor to implement the RPC protocol, such that NFS commands can be sent from a NFS client to an NFS server. The RPC commands may then be sent over a network, such as network 250 or a loopback interface (not shown) utilizing streams instructions 226. Streams are a protocol which may enable nodes to communicate with each other over a network.

The NFS server instructions 227 may implement the NFS server portion of the NFS protocol. That is, the NFS server instructions may receive NFS client instructions that were received over the streams and RPC instruction layers and translate those instructions into VFS commands. The VFS instructions 228 may be used by the node to translate the commands received from the NFS server layer into commands appropriate for the underlying physical file system 270.

In operation according to the techniques described herein, when a file access request is received by the NFS client, the NFS client instructions may determine if the NFS server that is exporting the directory containing the file is located on the same node as the NFS client. This may be done, for example, by determining if the IP addresses of the NFS client and the NFS server are the same. It should be understood that any other identifier that uniquely identifies the node running the NFS client and the NFS server may also be used.

If the NFS client and the NFS server are not running on the same node, the process proceeds as normal, traversing through the RPC and Streams instructions and being transmitted over the network 250. However, if the NFS client and the NFS server are running on the same node, the RPC and Streams layers may be bypassed. Instead, the NFS client instructions may directly access the VFS instructions 223. Because the VFS is able to directly operate on the underlying file system, and the underlying file system is directly attached to the node, the NFS server may be bypassed. Thus, the problems with accessing a NFS exported share when the NFS client and the NFS server are located on the same node are avoided.

Figure 3:
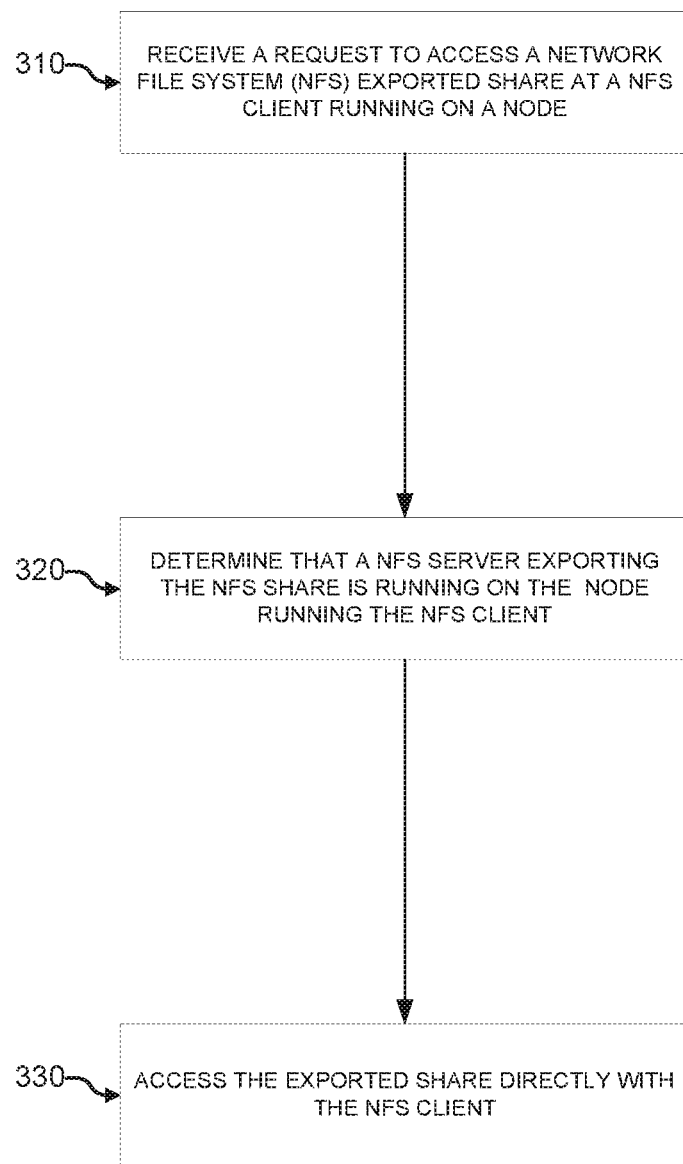
FIG. 3 is an example of a high level flow diagram for direct access to an exported share, according to techniques described herein.

FIG. 3 is an example of a high level flow diagram for direct access to an exported share, according to techniques described herein. In block 310, a request to access a Network File System (NFS) exported share may be received at a NFS client running on a node. In other words, an application or other process may attempt to access a directory that was mounted via the NFS protocol. The access request may be sent to the NFS client running on the node.

In block 320, it may be determined that a NFS server exporting the NFS share is running on the node running the NFS client. In other words, the NFS client and the NFS server are both running on the same node. As explained above, in such situations, the NFS client is running on the same node as the NFS server, and thus has direct access to the same file systems that can be accessed by the NFS server. In block 330, the exported share may be directly accessed by the NFS client. Because the NFS client has direct access to the file system containing the exported share, there is no need to access the share through the NFS server. The NFS client may access the exported share directly through the file system.

Figure 4:
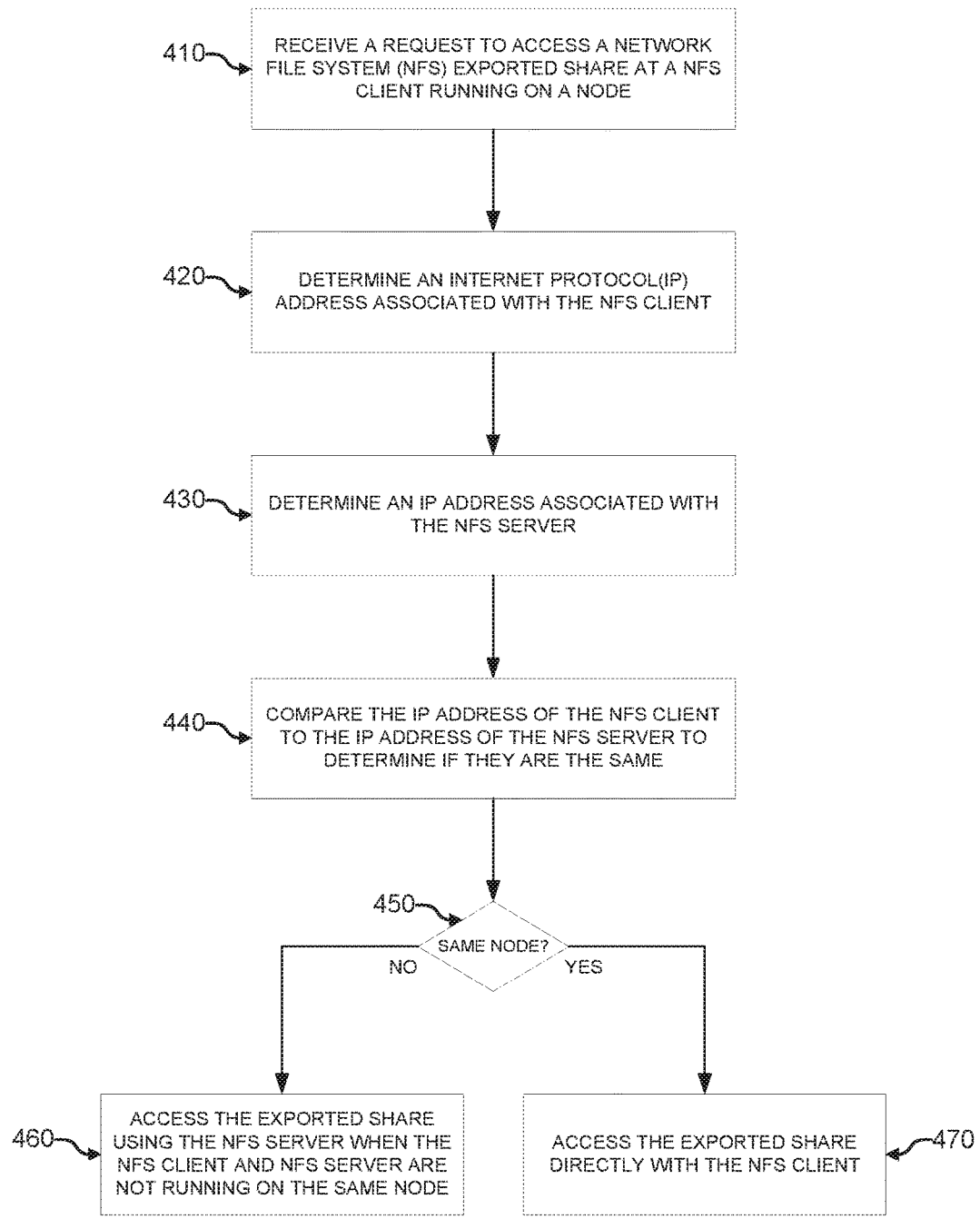
FIG. 4 is another example of a high level flow diagram for direct access to an exported share, according to techniques described herein.

FIG. 4 is another example of a high level flow diagram for direct access to an exported share, according to techniques described herein. In block 410, as above, a request to access a Network File System (NFS) exported share may be received at a NFS client running on a node. In block 420, an Internet Protocol (IP) address associated with the NFS client may be determined. The IP address may uniquely identify the node that is running the NFS client. Although an IP address may be used, any other address that uniquely identifies the node running the NFS client may also be suitable. For example, a Media Access Control (MAC) address may also be used to uniquely identify the client.

In block 430, an IP address associated with the NFS server may be determined. As explained above, an IP address may uniquely identify a node. In block 430, the IP address identifying the node running the NFS client may be determined. As explained with reference to block 420, any identifier that uniquely identifies the node may also be used. For example, a MAC address may also be suitable.

In block 440, the IP address of the NFS client may be compared to the IP address of the NFS server to determine if they are the same. In other words, it may be determined if both the NFS client and NFS server are running on the same node by determining if the IP address for the node running the NFS client and the node running the NFS server are the same. As explained above, an IP address is one suitable unique identifier. Another example of a unique identifier may be a MAC address. What should be understood is that it is determined if the NFS client and NFS server are running on the same node. The techniques described herein are not dependent on the particular mechanism used to determine if the nodes are the same.

In block 450, the result of the determination in block 440 is analyzed. If the NFS client and the NFS server are not running on the same node, the process moves to block 460. In block 460, the exported share may be accessed using the NFS server when the NFS client and NFS server are not running on the same node. In other words, when the NFS client and NFS server are not running on the same node, the normal process of accessing the exported share over a network is used.

If the NFS client and NFS server are running on the same node, the process moves to block 470. In block 470, the exported share may be accessed directly with the NFS client. As explained above, this means that the NFS server is bypassed and the exported share is accessed directly in the file system, thus consuming no resources that would otherwise be consumed had the access proceeded over the normal channels. In other words, no RPC. Streams, or file cache resources that would otherwise have been consumed had a network, including loopback, access been used would be needed.

Figure 5:
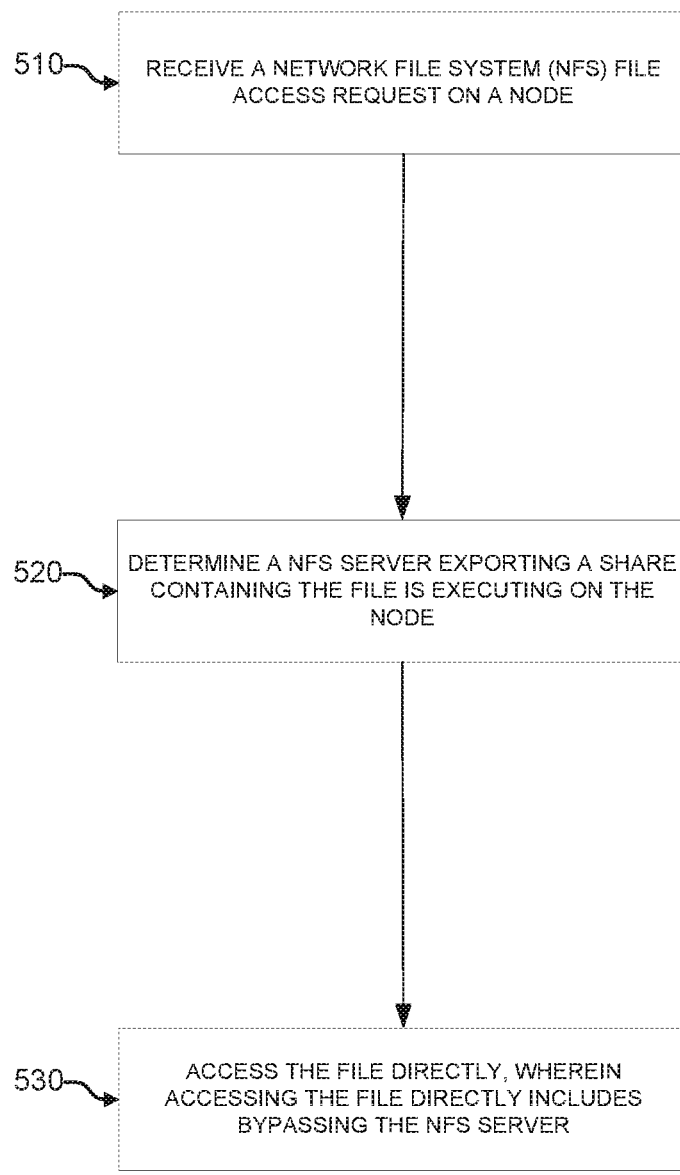
FIG. 5 is an example of a high level flow diagram for bypassing an NFS server, according to techniques described herein.

FIG. 5 is an example of a high level flow diagram for bypassing an NFS server, according to techniques described herein. In block 510, a Network File System (NFS) file access request on a node may be received. In other words, a node may be attempting to access a file that is included in a NFS share. The access attempt may be by an application running on the node.

In block 520, it may be determined if a NFS server exporting a share containing the file is executing on the node. In other words, it may be determined if the NFS server that is exporting the share that includes the file is running on the same node as the node that is attempting to access the file. In block 530, the file may be accessed directly, wherein accessing the file directly includes bypassing the NFS server. As explained above, bypassing the NFS server may eliminate the need to consume resources that would otherwise be used when accessing the exported share through the NFS server.

Figure 6:
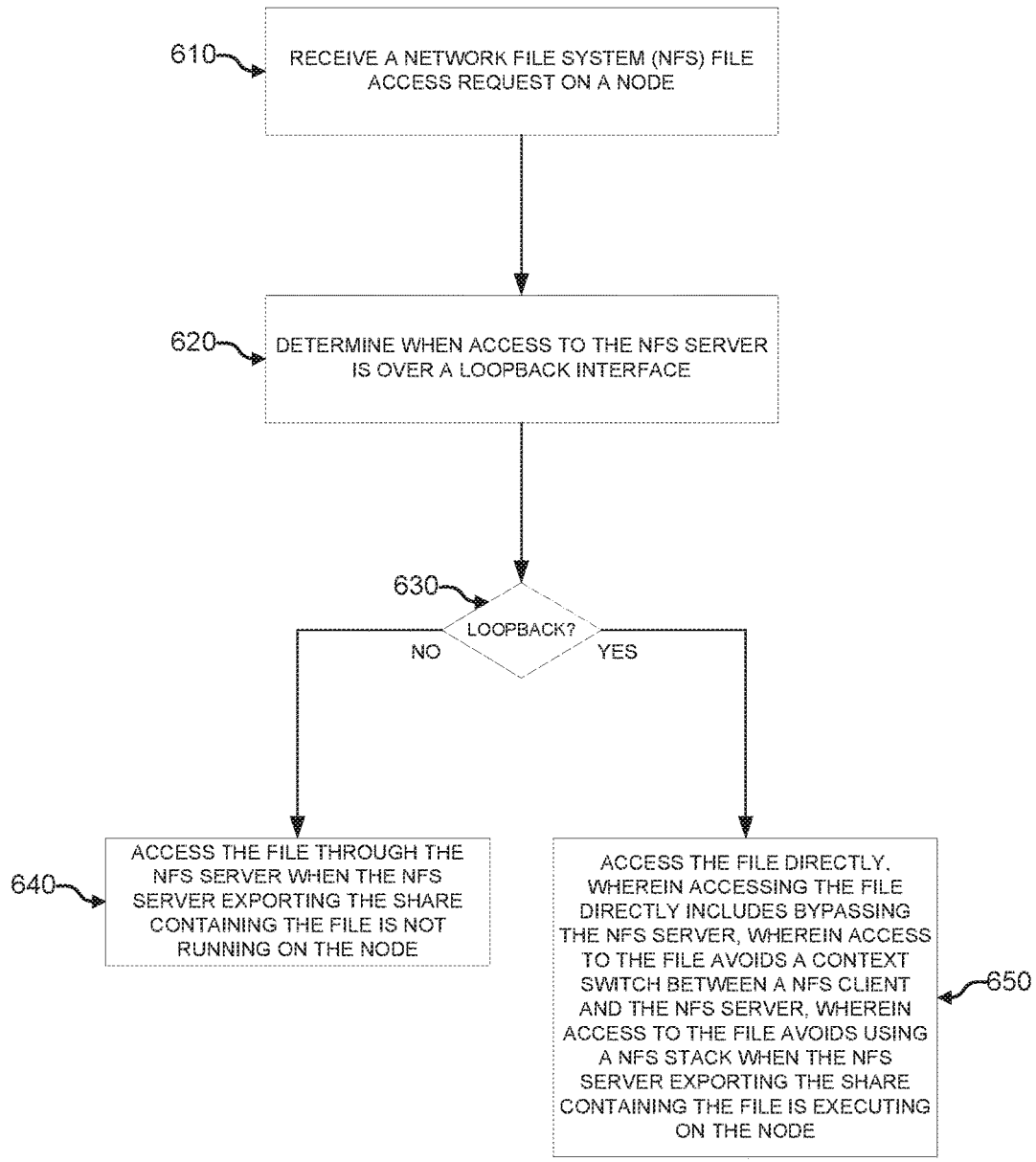
FIG. 6 is another example of a high level flow diagram for bypassing an NFS server, according to techniques described herein.

FIG. 6 is another example of a high level flow diagram for bypassing an NFS server, according to techniques described herein. In block 610, just as above in block 510, a Network File System (NFS) file access request on a node may be received. In block 620, it may be determined when access to the NFS server is over a loopback interface. In other words, it may be determined if the NFS client and the NFS server are running on the same node by determining if access to the NFS server will be over a loopback interface. A loopback interface may be used when a node wishes to communicate with itself using a protocol that is normally used when using a network between two nodes.

In block 630, the results of the determination in block 620 may be analyzed. If the access is not over a loopback interface, the process moves to block 640. In block 640, the file may be accessed through the NFS server when the NFS server exporting the share containing the file is not running on the node. In other words, the node requesting access to the file is not the same as the node that is exporting the share containing the file.

Otherwise, in block 650 the file may be access directly. Accessing the file directly may include bypassing the NFS server, wherein access to the file avoids a context switch between a NFS client and the NFS server. Access to the file may also avid using a NFS stack when the NFS server exporting the share containing the file is executing on the node.

We claim:

1. A method comprising:
   receiving a request to access a Network File System (NFS) exported share at an NFS client running on a node;
   determining that an NFS server exporting the NFS exported share is running on the node running the NFS client; and
   accessing the NFS exported share directly with the NFS client;
   wherein accessing the NFS exported share directly with the NFS client includes bypassing the NFS server and using direct Input/Output (IO) to access a local file system containing the NFS exported share.

2. The method of claim 1, wherein determining that an NFS server exporting the NFS exported share is running on the node running the NFS client comprises:
   determining a client Internet Protocol(IP) address associated with the NFS client;
   determining a server IP address associated with the NFS server; and
   comparing the client IP address to the server IP address of the NFS server to determine if they are both associated with the node.

3. The method of claim 1, wherein determining that an NFS server exporting the NFS exported share is running on the node running the NFS client comprises: determining if the NFS client uses a loopback interface to access the NFS server.

4. The method of claim 1, further comprising:
   accessing the NFS exported share using the NFS server when the NFS client and NFS server are not both running on the node.

5. The method of claim 1, wherein the local file system is a Veritas File System (VxFS).

6. A non-transitory processor readable medium containing processor executable instructions thereon, which, when executed by the processor cause the processor to:
   receive a Network File System (NFS) the access request on a node;
   determine if an NFS server exporting a share containing the file is executing on the node or is remote to the node; and
   based on a determination that the NFS server exporting the share is executing on the node, access the file directly, wherein accessing the file directly includes bypassing the NFS server and using direct Input/Output (IO) to access a local file system containing the NFS exported share.

7. The non-transitory processor-readable medium of claim 6, further comprising: based on a determination that the NFS server exporting the share is remote to the node, access the file through the NFS server.

8. The non-transitory processor-readable medium of claim 6, wherein bypassing the NFS server prevents the NFS server from using file cache system resources to cache the file in response to the NFS file access request.

9. The non-transitory processor-readable medium of claim 6, wherein determining if the NFS server exporting a share containing the file is executing on the node comprises instructions to: determine when access to the NFS server is over a loopback interface.

10. The non-transitory processor-readable medium of claim 6, wherein access to the file avoids a context switch between an NFS client and the NFS server.

11. The non-transitory processor-readable medium of claim 6, wherein access to the file avoids using an NFS stack when the NFS server exporting the share containing the file is executing on the node.

12. The non-transitory processor-readable medium computing apparatus of claim 6, wherein the file system is a Veritas File System (VxFS).

13. A system comprising:
    a node executing a Network File System (NFS) client, the NFS client to access a share exported by an NFS server; and
    a node executing the NFS server, the NFS server exporting the share,
    wherein the NFS client directly accesses a local file system associated with the share when the node executing the NFS client and the node executing the NFS server are a single node;
    wherein directly accessing the local files system associated with the share includes by passing the NFS server and using direct Input/Output (IO) to access a local file system containing the share exported by the NFS server.

14. The system of claim 13, wherein the NFS client accesses the share through the NFS server when the node executing the NFS client and the node executing the NFS server are different nodes.

15. The system of claim 13 further comprising: a network interface, wherein file access traverses the NFS client protocol stack and the NFS server protocol stack using the network interface when the NFS client and NFS server are executing on different nodes and bypasses the NFS client and NFS server protocol stack when the NFS client and NFS server are executing on the single node.

16. The system of claim 13, wherein the local file system is a Veritas File System (VxFS).

* * * * *